(12) United States Patent
Kulig et al.

(10) Patent No.: US 10,940,545 B2
(45) Date of Patent: Mar. 9, 2021

(54) DRILL BIT, SUCH AS AN AUGER DRILL BIT, AND METHOD THEREFORE

(71) Applicant: Disston Company, Chicopee, MA (US)

(72) Inventors: Eugene A. Kulig, Chicopee, MA (US); Jacky Zhang, Guangzhou (CN)

(73) Assignee: Disston Company, Chicopee, MA (US)

( * ) Notice: Subject to any disclaimer, the term of this patent is extended or adjusted under 35 U.S.C. 154(b) by 0 days.

(21) Appl. No.: 16/006,179

(22) Filed: Jun. 12, 2018

(65) Prior Publication Data

US 2019/0375028 A1 Dec. 12, 2019

(51) Int. Cl.
*B23B 51/02* (2006.01)

(52) U.S. Cl.
CPC .......... *B23B 51/02* (2013.01); *B23B 2251/14* (2013.01); *B23B 2251/18* (2013.01); *B23B 2251/201* (2013.01); *B23B 2251/48* (2013.01)

(58) Field of Classification Search
CPC .............. B23B 51/02; B23B 2251/201; B23B 2251/14; B23B 2251/18; B23B 2251/162; B23B 2251/48; B23B 2260/072; B27G 15/00
See application file for complete search history.

(56) References Cited

U.S. PATENT DOCUMENTS

| | | | |
|---|---|---|---|
| 36,534 A | 9/1862 | Sanford |
| 52,056 A | 1/1866 | Lamson |
| 79,012 A | 6/1868 | Sanford |
| 95,803 A | 10/1869 | Ives |
| RE4,156 E | 10/1870 | Ives |
| 166,221 A | 8/1875 | Parsons |
| 235,234 A | 12/1880 | Hardisty |
| 413,972 A | 10/1889 | Shaler |
| 606,319 A | 6/1898 | Watrous |
| 716,557 A | 12/1902 | Klingensmith |
| 782,368 A | 2/1905 | Swan |
| 1,004,902 A | 10/1911 | Potter |
| 1,260,068 A | 3/1918 | Sanders |
| 1,465,870 A | 8/1923 | Sanders |

(Continued)

FOREIGN PATENT DOCUMENTS

| | | | |
|---|---|---|---|
| CA | 2097971 | 12/1994 | |
| EP | 0278288 A1 * | 8/1988 | ............. B23B 51/02 |

(Continued)

*Primary Examiner* — Eric A. Gates
*Assistant Examiner* — Paul M Janeski
(74) *Attorney, Agent, or Firm* — K&L Gates LLP

(57) ABSTRACT

A drill bit includes an elongated shaft having an outer surface forming plural lands and spaces between the lands forming a helical flute; a shank located at a first end of the elongated shaft, the shank configured and arranged to engage the drill bit in a tool; a head located at an opposing end of the elongated shaft from the shank, the head including a first cutting arm and a second cutting arm, the first cutting arm including a first cutting portion having a first leading cutting edge, the second cutting arm including a second cutting portion having a second leading cutting edge; and wherein the first cutting arm includes a first groove extending through the first leading cutting edge and the second arm includes a second groove extending through the second leading cutting, the first and second grooves configured to cause shorter fibers, shavings or chips.

17 Claims, 8 Drawing Sheets

(56) References Cited

U.S. PATENT DOCUMENTS

| | | | |
|---|---|---|---|
| 1,483,082 A | | 2/1924 | Dosimont |
| 1,557,900 A | | 10/1925 | Thompson |
| 2,883,888 A | | 4/1959 | Stewart |
| 3,697,188 A | | 10/1972 | Pope |
| RE28,900 E | | 7/1976 | Byers et al. |
| 4,536,107 A | | 8/1985 | Sandy et al. |
| 5,011,342 A | * | 4/1991 | Hsu .................. B23B 51/02 |
| | | | 408/224 |
| 5,244,319 A | | 9/1993 | Cochran |
| 5,452,971 A | * | 9/1995 | Nevills ............... B23B 51/00 |
| | | | 408/229 |
| 6,371,702 B1 | * | 4/2002 | DeWald, Jr. ........ B23B 51/0009 |
| | | | 408/227 |
| D559,874 S | * | 1/2008 | Kobayashi ............... D15/139 |
| 2001/0019687 A1 | * | 9/2001 | Eberhard ............... B27G 15/00 |
| | | | 408/211 |

FOREIGN PATENT DOCUMENTS

| | | |
|---|---|---|
| GB | 13484 | 1/1912 |
| JP | 11156811 A * | 6/1999 |
| JP | 2006192820 | 7/2006 |

\* cited by examiner

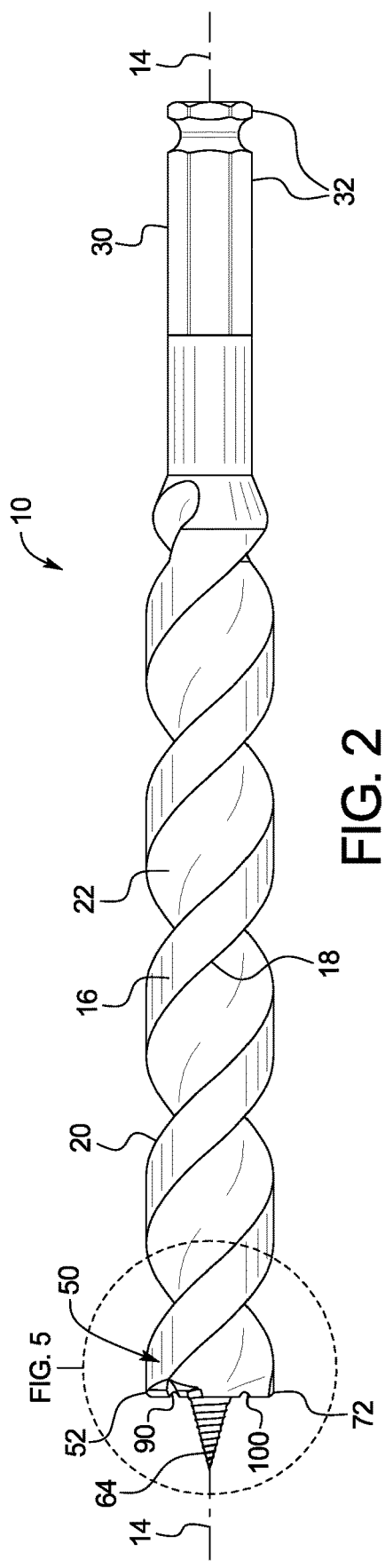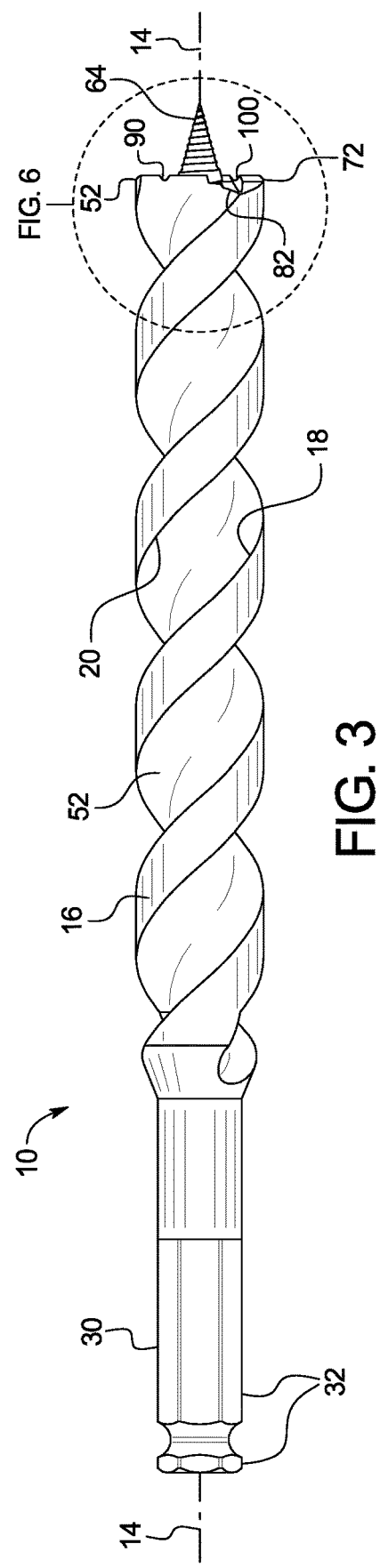

DRILL BIT, SUCH AS AN AUGER DRILL BIT, AND METHOD THEREFORE

BACKGROUND

The present disclosure relates to cutting tools and in particular to drill bits.

Drill bits are used commonly in the construction, maintenance and machining industries. A variety of drill bits have been developed. Certain drill bits are specific purpose drill bits, while other bits are multipurpose. Construction and maintenance applications often involve the installation of wiring, plumbing and pipe fitting, which may be routed through wall studs, roof joists, floor joists and other supporting structure. The installations accordingly commonly involve drilling through the supporting structures.

The supporting structures are often made of wood. Wood is a non-uniform material, and this non-uniformity may cause problems in the boring process. For example, wood may have a non-uniform density, knots, wood rot, and/or pitch pockets. Occasionally, nails or other fasteners that may interfere with the boring process. Other materials through which holes are drilled include plastic, e.g., polyvinyl chloride ("PVC") pipe, and metal, e.g., steel mounting brackets. These materials may also be non-uniform.

Different drill bit types may be used to bore the above-described holes. The different drill bits use different boring techniques, which may vary greatly. Available boring bits include standard drill bits and auger type drill bits or auger bits. Auger drill bits have a number of advantages over other drill bits. For example, auger drill bits typically provide a self-feeding lead screw for urging the bit into the workpiece, a cutting edge to lift the severed workpiece fibers or shavings, and a helix-shaped flute formed by and proceeding along the shaft of the bit to provide a mechanism for waste (e.g., fiber, shaving or chip) removal.

Standard drill bits do not have the lead screw of the auger drill bits, but do include a drill head for severing the workpiece to form the radius of the bore, the drill head having a cutting edge to lift the severed workpiece fibers, shavings or chips, and a helix shaped flute formed by and proceeding along the shaft of the bit to provide a mechanism for waste (e.g., fiber, shaving or chip) removal.

One drawback with standard and auger drill bits is that the helix shaped flute may be too narrow and/or too shallow to sufficiently remove waste. This in combination with the continuing rotation of the drill bit and subsequent advancement of the bit causes the cutting edge to uplift the fibers or shavings previously severed, forming chips. Friction between the chips and the cylindrical surface of the created bore and the helical inclination of flute cause the chips to advance away from the cutting edge and ultimately out of the bore. The drawback is exacerbated when the waste fibers, shavings or chips are longer and more difficult to fit into the helical flue.

An improved drill bit and in particular an improved auger drill bit is needed accordingly.

SUMMARY

The examples described herein disclose a drill bit, such as an auger drill bit, which is configured to create shorter fibers, shavings or chips. The drill bit may have a cutting head with multiple cutting arms, each arm including a cutting portion bounded on one side by a leading cutting edge. At least one elongated groove may be formed in at least one of the cutting portions, such that the at least one groove extends through an end of the respective cutting edge, forming a discontinuous cutting edge, which in turn creates discontinuous and thus shorter fibers, shavings or chips. The shorter fibers, shavings or chips are more readily carried through a helical flute formed in an elongated shaft leading to the head of the drill bit. The more readily dispensed with fibers, shavings or chips enable the speed at which the drill bit may be driven by a tool to be increased. The increased speed along with lessened down time due to having to remove the drill bit from the workpiece to remove fibers, shavings or chips increases overall workpiece throughput.

In light of the disclosure herein and without limiting the disclosure in any way, in a first aspect of the present disclosure, which may be combined with any other aspect listed herein unless specified otherwise, a drill bit includes an elongated shaft having an outer surface forming plural lands and spaces between the lands further forming a helical flute; a shank located at a first end of the elongated shaft, the shank configured and arranged to engage the drill bit in a tool; a head located at an opposing end of the elongated shaft from the shank, the head including a first cutting arm and a second cutting arm, the first cutting arm including a first cutting portion having a first leading cutting edge, the second cutting arm including a second cutting portion having a second leading cutting edge; and wherein the first cutting arm includes a first groove extending through the first leading cutting edge and the second arm includes a second groove extending through the second leading cutting edge, the first and second grooves configured to cause shorter fibers, shavings or chips to be formed when the elongated shaft is operated by the tool.

In a second aspect of the present disclosure, which may be combined with any other aspect listed herein unless specified otherwise, the first cutting arm further includes a relief portion that tapers away from the first cutting portion at a relief angle, and wherein the first groove extends into or through the relief portion.

In a third aspect of the present disclosure, which may be combined with any other aspect listed herein unless specified otherwise, the second cutting arm further includes a relief portion that tapers away from the second cutting portion at a relief angle, and wherein the second groove extends into or through the relief portion.

In a fourth aspect of the present disclosure, which may be combined with any other aspect listed herein unless specified otherwise, the drill bit is an auger drill bit, wherein the head includes a lead screw aligned along a central axis of the head.

In a fifth aspect of the present disclosure, which may be combined with any other aspect listed herein unless specified otherwise, the first and second grooves are at least one of sized or shaped the same.

In a sixth aspect of the present disclosure, which may be combined with any other aspect listed herein unless specified otherwise, the first and second grooves are at least one of sized or shaped the differently.

In a seventh aspect of the present disclosure, which may be combined with any other aspect listed herein unless specified otherwise, at least one of the first or second grooves has a boat hull shape.

In an eighth aspect of the present disclosure, which may be combined with any other aspect listed herein unless specified otherwise, at least one of the first or second grooves includes first and second groove edges that taper towards each other.

In a ninth aspect of the present disclosure, which may be combined with any other aspect listed herein unless specified otherwise, at least one of the first or second grooves includes first and second groove edges that meet at a rounded interface.

In a tenth aspect of the present disclosure, which may be combined with any other aspect listed herein unless specified otherwise, at least one of the first or second grooves includes a maximum depth of up to and including four millimeters ("mm") for a ½ inch diameter size auger drill bit. The maximum groove depth may increase, e.g., proportionally, as the drill bit diameter increases.

In an eleventh aspect of the present disclosure, which may be combined with any other aspect listed herein unless specified otherwise, at least one of the first or second grooves includes a maximum depth that is 5% to 10% of the distance of the radius from a central axis of the head to the outer surface of the elongated shaft.

In a twelfth aspect of the present disclosure, which may be combined with any other aspect listed herein unless specified otherwise, at least one of the first or second grooves includes first and second edges and a maximum width between the first and second edges of up to and including five millimeters ("mm") for a ½ inch diameter size auger drill bit. The maximum groove width may increase, e.g., proportionally, as the drill bit diameter increases.

In a thirteenth aspect of the present disclosure, which may be combined with any other aspect listed herein unless specified otherwise, at least one of the first or second grooves includes first and second edges and a maximum width between the first and second edges that is 5% to 30% of the distance of the radius from a central axis of the head to the outer surface of the elongated shaft.

In a fourteenth aspect of the present disclosure, which may be combined with any other aspect listed herein unless specified otherwise, at least one of the first or second grooves includes a maximum length from the first or second leading cutting edge to an opposing end of the groove of up to and including ten millimeters ("mm") for a ½ inch diameter size auger drill bit. The maximum groove length may increase, e.g., proportionally, as the drill bit diameter increases.

In a fifteenth aspect of the present disclosure, which may be combined with any other aspect listed herein unless specified otherwise, at least one of the first or second grooves includes a length from the first or second leading cutting edge to an opposing end of the groove that is 15% to 85% of the distance of the radius from a central axis of the head to the outer surface of the elongated shaft.

In a sixteenth aspect of the present disclosure, which may be combined with any other aspect listed herein unless specified otherwise, a drill bit includes an elongated shaft including an outer surface forming plural lands and spaces between the lands forming a helical flute; a shank located at a first end of the elongated shaft, the shank configured and arranged to engage the drill bit in a tool; a head located at an opposing end of the elongated shaft from the shank, the head including a first cutting portion having a first leading cutting edge and a second cutting portion having a second leading cutting edge; and wherein the first cutting portion includes a first groove extending through the first leading cutting edge so as to form plural first cutting edge segments and the second arm includes a second groove extending through the second leading cutting edge so as to form plural second cutting edge segments.

In a seventeenth aspect of the present disclosure, which may be combined with any other aspect listed herein unless specified otherwise, at least one of the first and second cutting portions includes two or more grooves extending through their respective leading cutting edge so as to form three or more cutting edge segments.

In an eighteenth aspect of the present disclosure, which may be combined with any other aspect listed herein unless specified otherwise, the head includes a lead screw forming an auger drill bit.

In a nineteenth aspect of the present disclosure, which may be combined with any other aspect listed herein unless specified otherwise, a method of operating a drill bit includes enabling an elongated shaft of the drill bit to be turned by a tool; causing at least one cutting edge of the drill bit to be discontinuous so as to create discontinuous and thereby shorter fibers, shavings or chips when the elongated shaft is tuned by the tool; and enabling the shorter fibers, shavings or chips to be routed towards a tool end of the bit via a flute formed in the elongated shaft.

In a twentieth aspect of the present disclosure, which may be combined with any other aspect listed herein unless specified otherwise, causing at least one cutting edge of the drill bit to be discontinuous so as to create discontinuous and thereby shorter fibers, shavings or chips includes forming at least one groove that extends through the at least one cutting edge.

In a twenty-first aspect of the present disclosure, any of the structure, functionality and alternatives disclosed in connection with FIGS. 1 to 9 may be combined with any of the other structure, functionality and alternatives disclosed in connection with FIGS. 1 to 9.

In light of the present disclosure and the above aspects, it is therefore an advantage of the present disclosure to provide an improved drill bit, such as an auger drill bit.

It is another advantage of the present disclosure to provide a drill bit that creates shorter fibers, shavings or chips.

It is a further advantage of the present disclosure to provide a drill bit having improved speed and/or throughput.

It is still another advantage of the present disclosure to provide a drill bit having at least one groove extending though at least one cutting edge to create discontinuous fibers, shavings or chips.

The advantages discussed herein may be found in one, or some, and perhaps not all of the embodiments disclosed herein. Additional features and advantages are described herein, and will be apparent from, the following Detailed Description and the figures.

BRIEF DESCRIPTION OF THE FIGURES

FIG. 2 is a left side elevation view of the drill bit illustrated in FIG. 1.

FIG. 3 is a right side elevation view of the drill bit illustrated in FIG. 1.

DETAILED DESCRIPTION

Figure 1:
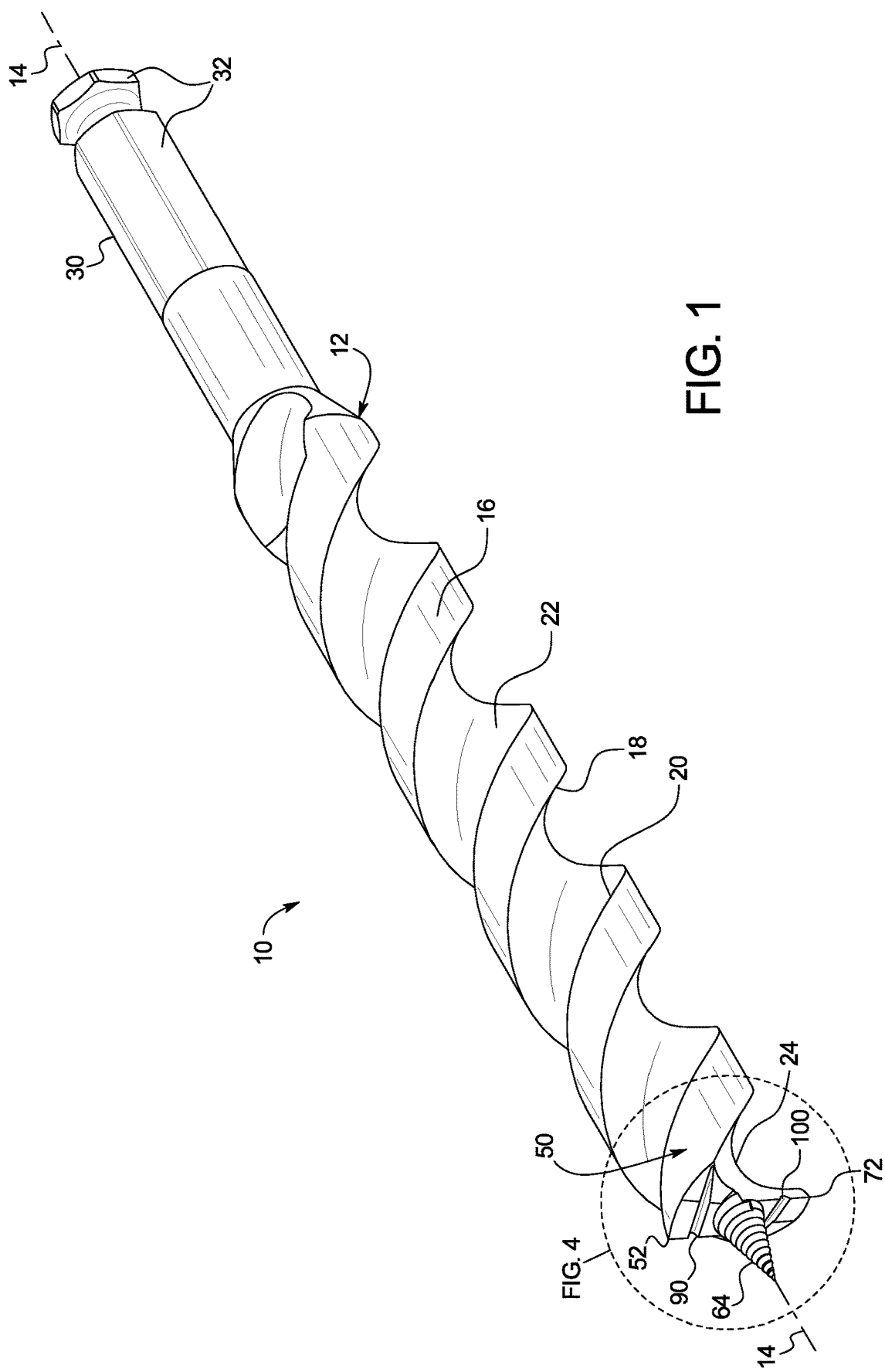
FIG. 1 is a perspective view illustrating one embodiment for a drill bit having discontinuous cutting edges of the present disclosure.

Referring to the drawings and in particular to FIGS. 1 to 7, one embodiment of a drill bit, such as an auger drill bit of the present disclosure, is illustrated by drill bit 10. Drill bit 10 may be made of any one or more different material, such as one or more metal, e.g., steel, stainless steel, titanium, aluminum, copper, bronze, and combinations or alloys thereof. Drill bit 10 may additionally be made of any of the metals, combinations and alloys thereof listed above and then coated with any of the metals, combinations and alloys thereof.

Drill bit 10 includes an elongate shaft 12 that extends along a longitudinal central axis 14. The length and diameter of elongated shaft 12 may be sized as desired to provide any known standard English unit or metric size drill bit. An outer surface 16 of elongate shaft 12 has elongate helical land 18 formed thereon, which extends from a head 50 of drill bit 10 to a shank 30 of the drill bit. The space between the elongate helical land 18 and the adjacent following portion 20 of the adjacent turn on the land 18 forms a helical fluted groove or helical flute 22. An inlet throat 24 is provided at a lead portion of flute 22 as illustrated perhaps best in FIGS. 1 and 4. Shaft 12 via flute 22 is configured and arranged to remove the waste material (e.g., fibers, shavings or chips) from the workpiece during operation of drill bit 10.

It has been found that the depth of flute 22 may affect the ability of drill bit 10 to effectively remove the waste materials during operation. Specifically, the greater the depth of flute 22, the more easily waste is removed. To determine a desired depth for flute 22, the desire to remove waste is balanced against a desire to provide a structurally sound drill bit 10. As the depth of flute 22 increases, the strength of the drill bit as a whole is reduced, since the amount of material in the drill bit is reduced. In addition, as adjacent turns of the elongate helical lands 18 are spaced further apart, it becomes increasingly more difficult to maintain drill bit 10 in an aligned arrangement when in use, e.g., to prevent shaft 12 from bending under an operational load against the workpiece. There are accordingly reasons to reduce the depth of flute 22.

Shank 30 of drill bit 10 is configured and arranged to engage drill bit 10 in a tool, typically a motorized drill (not shown). Shank 30 may have a hexagonal shaped end 32 so as to be firmly grasped and held by the motorized drill.

Figure 4:
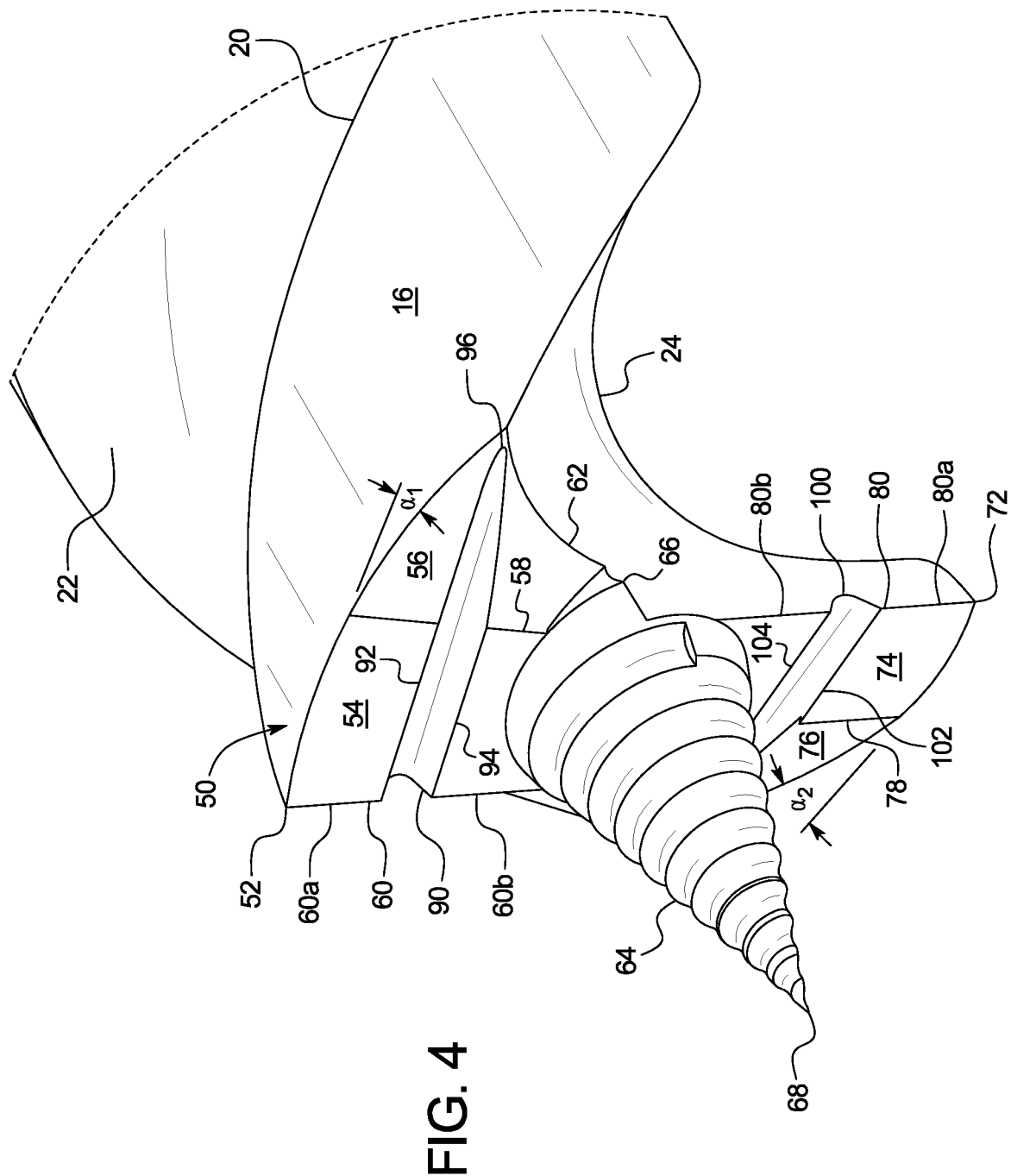
FIG. 4 is an expanded perspective view of one embodiment of a head of the drill bit as illustrated in FIG. 1.
Figure 5:
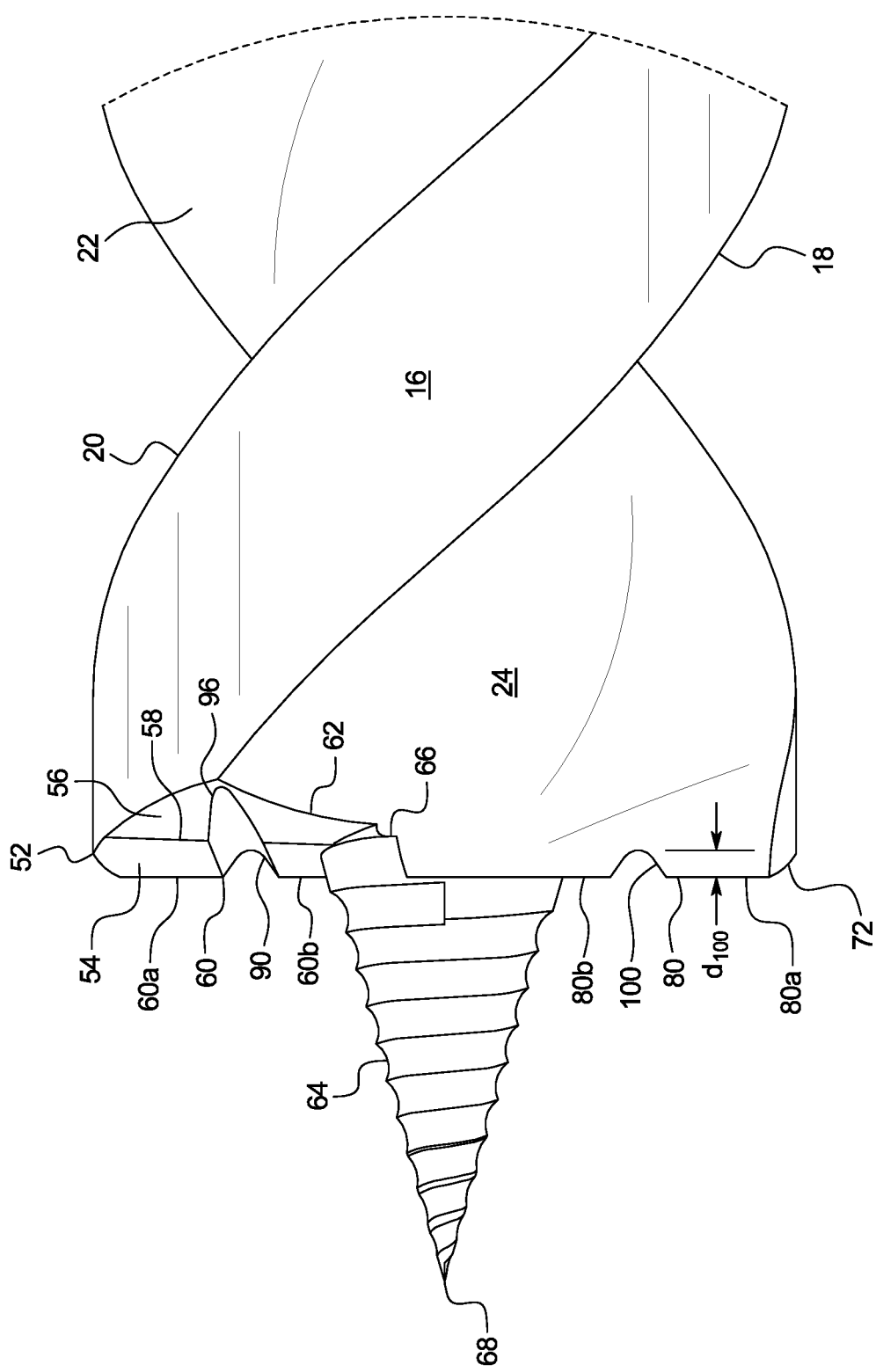
FIG. 5 is an expanded left side elevation view of one embodiment of a head of the drill bit as illustrated in FIG. 2.
Figure 6:
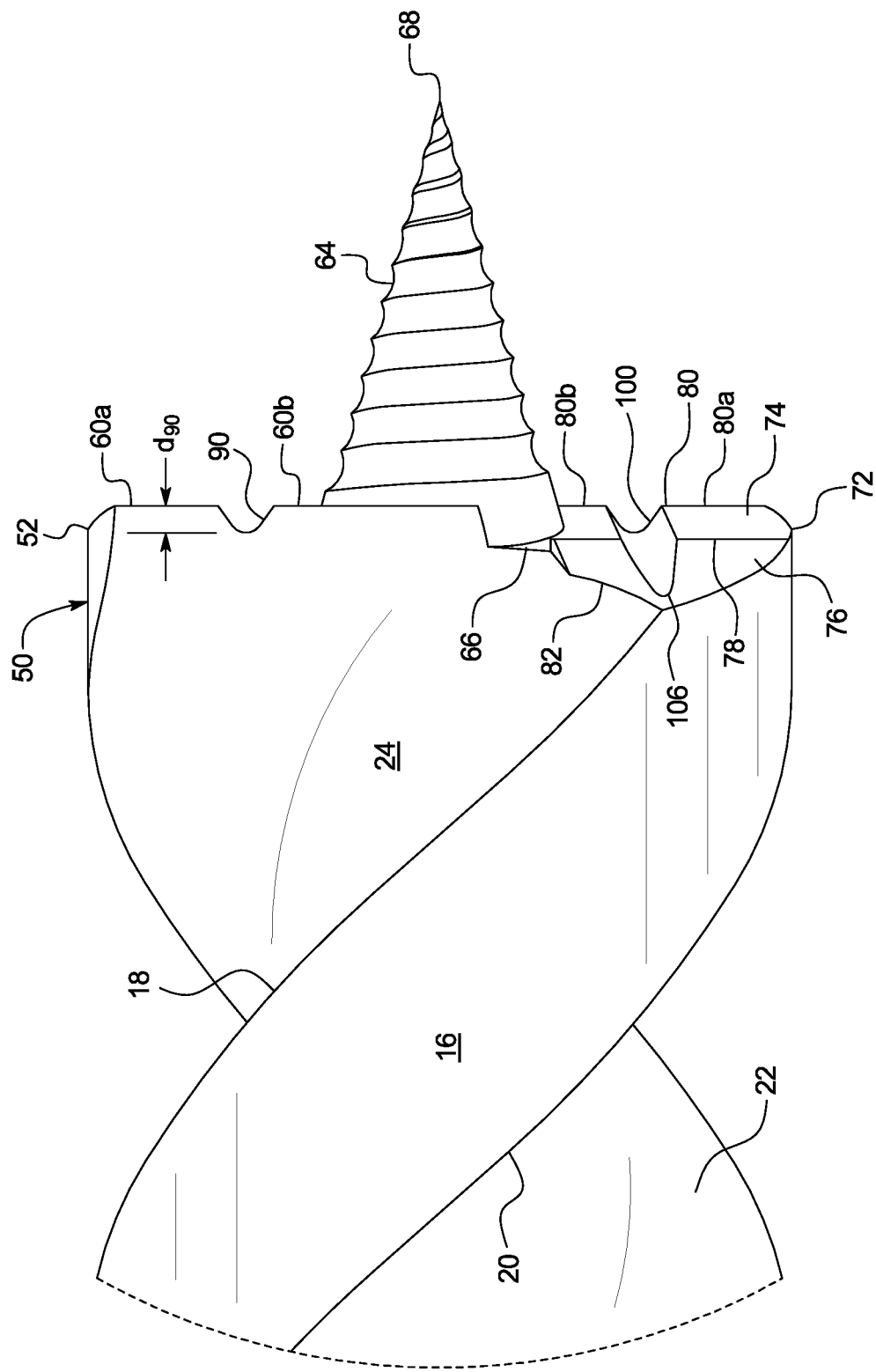
FIG. 6 is an expanded right side elevation view of one embodiment of a head of the drill bit as illustrated in FIG. 3.
Figure 7:
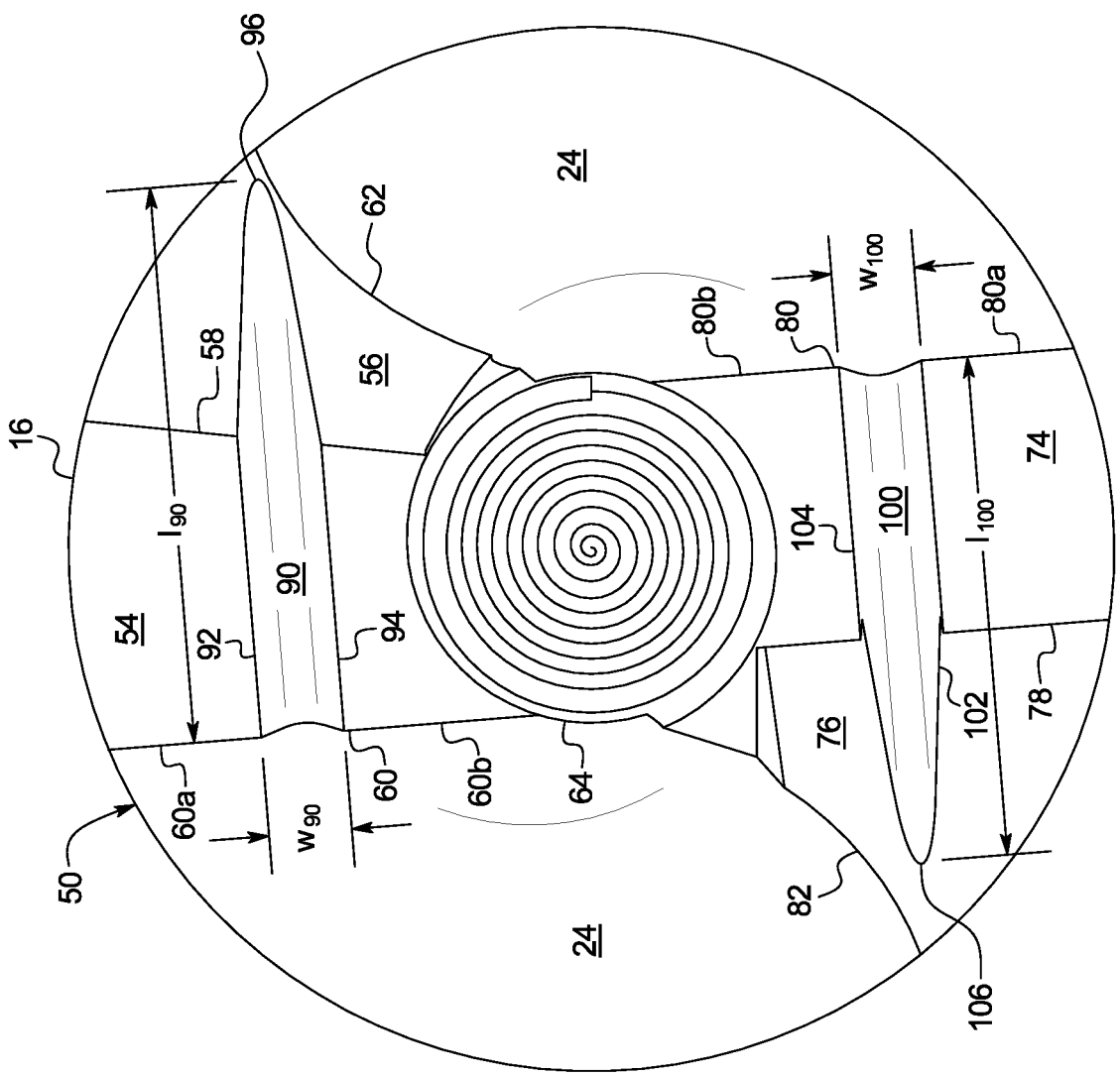
FIG. 7 is a front elevation view of one embodiment of a head of the drill bit as illustrated in FIGS. 4 to 6.

As illustrated best in FIGS. 4 to 6, head 50 of drill bit 10 includes a first cutting arm 52 and a second cutting arm 72. First cutting arm 52 includes a cutting portion 54, which may be positioned (i) generally perpendicular to longitudinal central axis 14, or (ii) angle slightly towards a relief portion 56, wherein relief portion 56 tapers beginning at a taper edge 58 inwardly towards the shank end of drill bit 10 relative to cutting portion 54 at a desired relief angle $\alpha1$ (e.g., 5° to 45°). Cutting portion 54 includes a leading cutting edge 60, which engages the workpiece and cuts or forms a portion of the bore in the workpiece. Relief portion 56 includes a trailing edge 62, which may be curved as illustrated to help guide waste materials (e.g., fibers, shavings or chips) into flute 22, where the waste materials may be moved towards the shank end of drill bit 10 and away from the workpiece.

Second cutting arm 72 includes a cutting portion 74, which may be positioned (i) generally perpendicular to longitudinal central axis 14, or (ii) angle slightly towards a relief portion 76, wherein relief portion 76 tapers beginning at a taper edge 78 inwardly towards the shank end of drill bit 10 relative to cutting portion 74 at a desired relief angle $\alpha2$ (e.g., 5° to 45°), which may be the same or different as relief angle $\alpha1$. Cutting portion 74 includes a leading cutting edge 80, which engages the workpiece and cuts or forms the other portion of the bore in the workpiece. Relief portion 76 includes a trailing edge 82 (FIG. 7), which may be curved as illustrated to help guide waste materials (e.g., fibers, shavings or chips) into flute 22, where the waste materials may be moved towards the shank end of drill bit 10 and away from the workpiece.

If drill bit 10 is an auger drill bit, then the bit includes a lead screw 64 as illustrated in each of FIGS. 1 to 7. Lead screw 64 may be a threaded, self-feeding conical screw such that in use, lead screw 64 causes bit 10 to be urged into the workpiece. Lead screw 64 in the illustrated embodiment has a maximum diameter 66 at its base that is less than the diameter of elongated shaft 12, e.g., less than half the diameter of shaft 12. In the illustrated embodiment, the threads of lead screw 64 taper to a point or tip 68, which is the first structure of drill bit 10 to engage the workpiece. Point or tip 68 establishes the center of the bore and punctures the workpiece to allow the threads of lead screw 64 to engage the workpiece, providing a self-feeding characteristic of the auger version drill bit 10.

If drill bit 10 is instead a standard drill bit, then lead screw 64 is not provided. FIGS. 2, 3, 5 and 6 show cutting portion 54 of first cutting arm 52 and cutting portion 74 of second cutting arm 72 as being generally flat relative to each other and perpendicular relative to central axis 14. In the case of a standard drill bit 10 (without lead screw 64), cutting portion 54 of first cutting arm 52 and cutting portion 74 of second cutting arm 72 are instead tapered conically, outwardly (not illustrated) from the shank end of drill bit 10 so as to form a point or tip (not illustrated), which becomes the first structure of drill bit 10 to engage the workpiece and establishes the center of the bore.

Regardless of whether drill bit 10 is an auger drill bit or a standard drill bit 10, it is contemplated to form at least one groove 90 in first cutting portion 54, which may extend as illustrated to first relief portion 56, and at least one groove 100 in second cutting portion 74, which may extend as illustrated to second relief portion 76. As illustrated in each of FIGS. 1 to 7, grooves 90 and 100 may extend through the ends of their respective leading cutting edges 60 and 80. Grooves 90 and 100 may be sized and shaped the same or be different in size and/or shape from one another.

Groove 90 may include elongate groove edges 92 and 94 that taper towards each other as the edges extend from leading cutting edge 60 towards and possibly through the taper edge 58 defining the rear of cutting portion 54 of first cutting arm 52. Edges 92 and 94 meet at a rear rounded interface 96 in relief portion 56 in the illustrated embodiment. In an embodiment, a maximum depth $d_{90}$ of groove 90 is up to and including four millimeters ("mm") for a ½ inch diameter drill bit. Maximum depth $d_{90}$ may increase, e.g., proportionally, as the diameter of drill bit 10 increases. Maximum depth $d_{90}$ may be for example 5% to 10% of the distance of radius R from central axis 14 to the outer surface of shaft 12. In an embodiment, a maximum width $w_{90}$ of groove 90 between edges 92 and 94 is up to and including five millimeters ("mm") for a ½ inch diameter drill bit. Maximum width $w_{90}$ may increase, e.g., proportionally, as the diameter of drill bit 10 increases. Maximum width $w_{90}$ may be for example 5% to 30% of the distance of radius R from central axis 14 to the outer surface of shaft 12. In an embodiment, a length $l_{90}$ of groove 90 from leading cutting edge 60 to the opposing edge of rounded interface 96 is up to and including ten millimeters ("mm") for a ½ inch diameter drill bit. Maximum length $l_{90}$ may increase, e.g., proportionally, as the diameter of drill bit 10 increases. Length $l_{90}$ may be for example 15% to 85% of the distance of radius R from central axis 14 to the outer surface of shaft 12.

Groove 100 may again be sized and shaped the same or be different from groove 90. Groove 100 may include elongate groove edges 102 and 104 that taper towards each other as the edges extend from leading cutting edge 80 towards and possibly through the taper edge 78 defining the rear of cutting portion 74 of first cutting arm 72. Edges 102 and 104 meet at a rear rounded interface 106 in relief portion 76 in the illustrated embodiment. In an embodiment, a maximum depth $d_{100}$ of groove 100 is up to and including four millimeters ("mm") for a ½ inch diameter drill bit. Maximum depth $d_{100}$ may increase, e.g., proportionally, as the diameter of drill bit 10 increases. Maximum depth $d_{100}$ may be for example 5% to 10% of the distance of radius R from central axis 14 to the outer surface of shaft 12. In an embodiment, a maximum width $w_{100}$ of groove 100 between edges 102 and 104 is up to and including five millimeters ("mm") for a ½ inch diameter drill bit. Maximum width $w_{100}$ may increase, e.g., proportionally, as the diameter of drill bit 10 increases. Maximum width $w_{100}$ may be for example 5% to 30% of the distance of radius R from central axis 14 to the outer surface of shaft 12. In an embodiment, a length $l_{100}$ of groove 100 from leading cutting edge 80 to the opposing edge of rounded interface 106 is up to and including ten millimeters ("mm") for a ½ inch diameter drill bit. Maximum length $l_{100}$ may increase, e.g., proportionally, as the diameter of drill bit 10 increases. Length $l_{100}$ may be for example 15% to 85% of the distance of radius R from central axis 14 to the outer surface of shaft 12.

Grooves 90 and 100 as illustrated have a boat hull shape in one embodiment.

Grooves 90 and 100 cause cutting edges 60 and 80, respectively, to be split into smaller cutting edge segments 60a, 60b and 80a, 80b. Smaller cutting edge segments 60a, 60b and 80a, 80b cut smaller fibers, shavings or chips. The smaller fibers, shavings or chips are more easily removed via grooves 90 and 100 and/or relief portions 56, 76 into inlet throat 24 of helical flute 22, where they can be transported towards shank 30 of drill bit 10. The smaller fibers, shavings or chips are also less likely to (i) become bound between outer surface 16 of elongate shaft 12 and an inner surface of a circular bore made by drill bit 10 and (ii) cause the user to have to back drill bit 10 out of the workpiece to clear the waste materials. For multiple reasons, grooves 90 and 100 improve the cutting of drill bit 10, including the speed at which the drill bit may advance through the workpiece and the overall throughput of the bit to complete the job.

Figure 8:
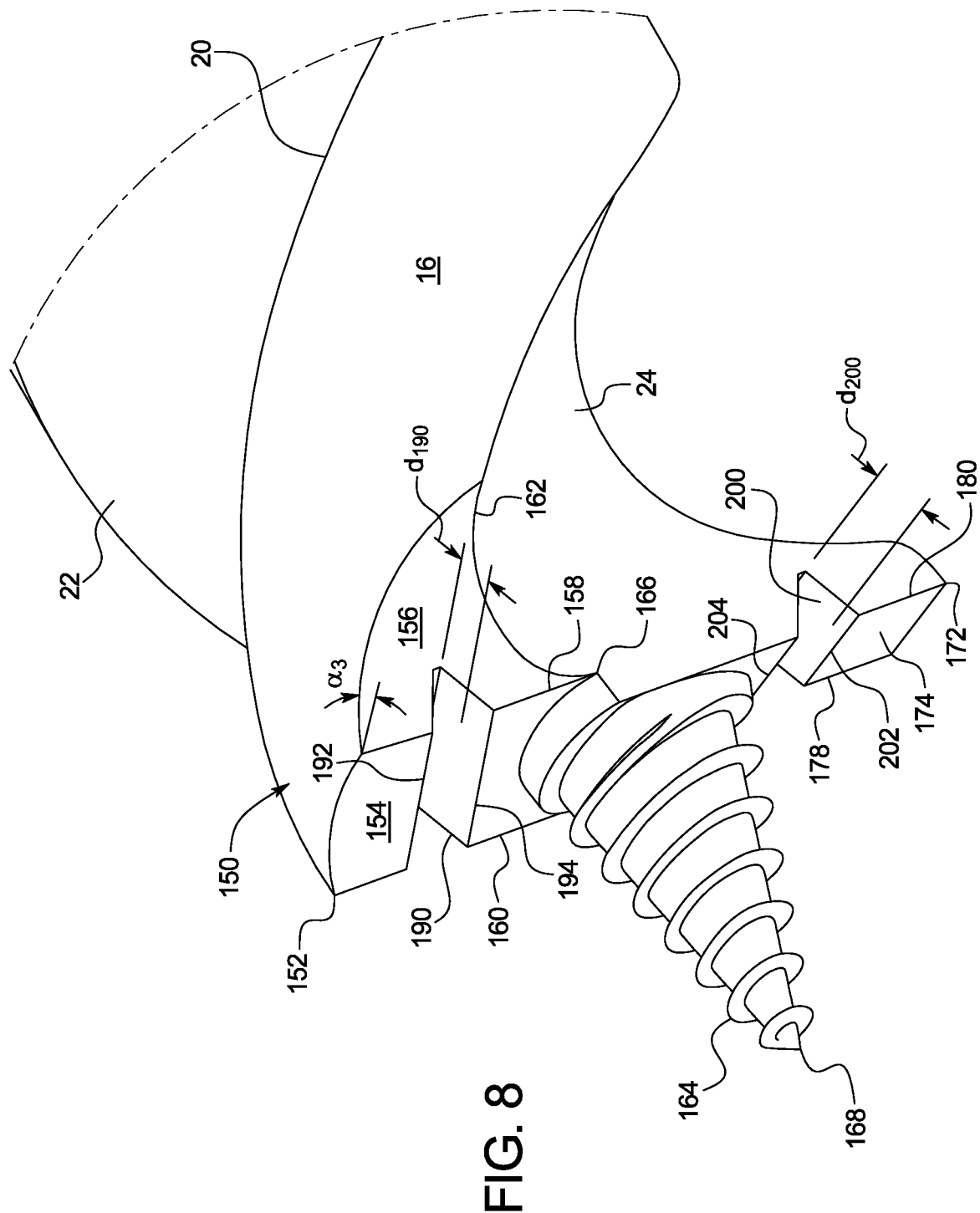
FIG. 8 is an expanded perspective view of another embodiment of a head useable with the drill bit as depicted in FIGS. 1 to 3.
Figure 9:
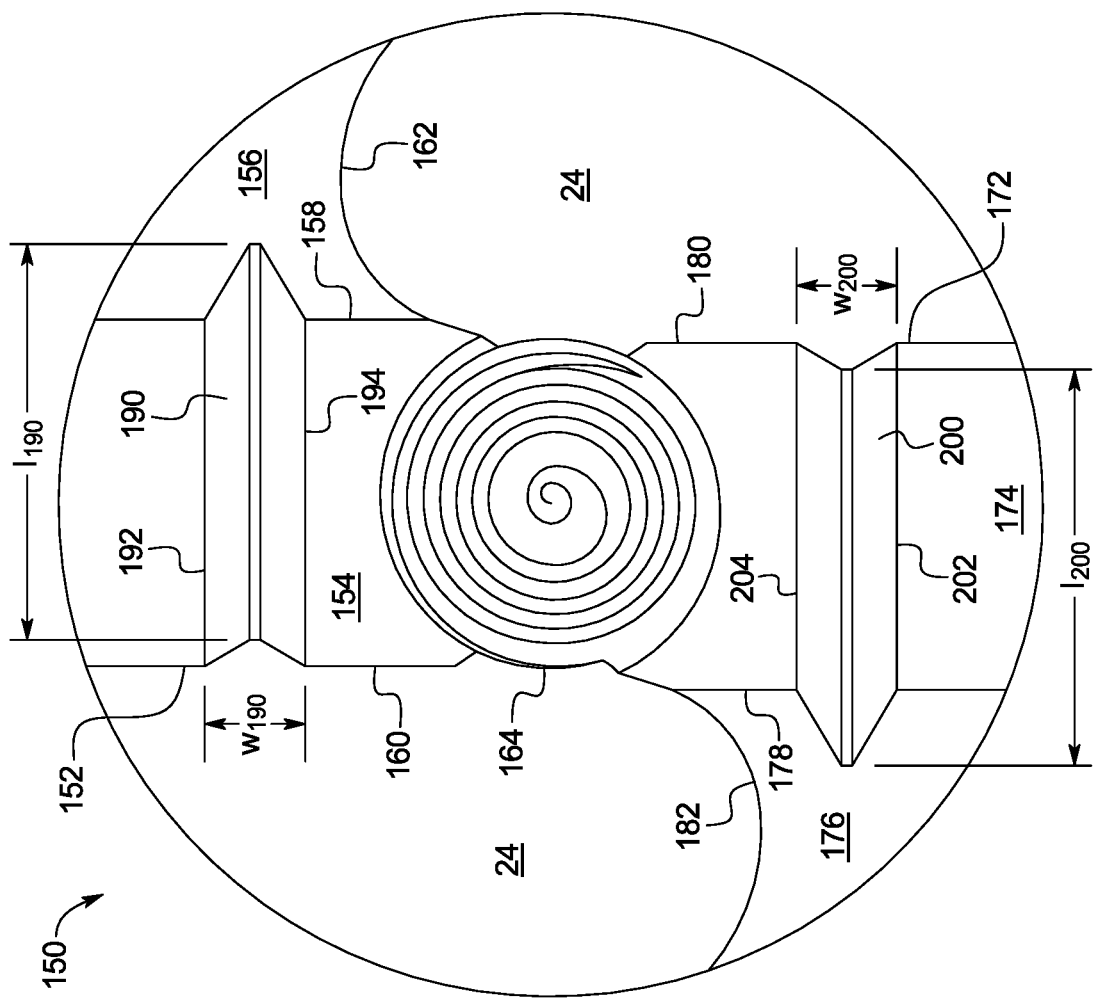
FIG. 9 is a front elevation view of one embodiment of the drill bit head of FIG. 8 of the present disclosure.

Referring now to FIGS. 8 and 9, an alternative head 150 for drill bit 10 is illustrated. All structure, functionality and alternatives described above for drill bit 10 in FIGS. 1 to 7 is applicable to a drill bit 10 including head 150. The differences between drill bit 10 having head 50 versus drill bit 10 having head 150 are described in connection with FIGS. 8 and 9.

Head 150 includes a first cutting arm 152 and a second cutting arm 172. First cutting arm 152 includes a cutting portion 154, which may be positioned (i) generally perpendicular to longitudinal central axis 14, or (ii) angle slightly towards a relief portion 156, wherein relief portion 156 tapers beginning at a taper edge 158 inwardly towards the shank end of drill bit 10 relative to cutting portion 154 at a desired relief angle $\alpha 3$ (e.g., 10° to 60°, where the angle may change along the relief portion). Cutting portion 154 includes a leading cutting edge 160, which engages the workpiece and cuts or forms a portion of the bore in the workpiece. Relief portion 156 includes a trailing edge 162, which may be curved as illustrated to help guide waste materials (e.g., fibers, shavings or chips) into flute 22, where the waste materials may be moved towards the shank end of drill bit 10 and away from the workpiece.

Second cutting arm 172 includes a cutting portion 174, which may be positioned (i) generally perpendicular to longitudinal central axis 14, or (ii) angle slightly towards a relief portion 176, wherein relief portion 176 tapers beginning at a taper edge 178 inwardly towards the shank end of drill bit 10 relative to cutting portion 174 at a desired relief angle $\alpha 4$ (e.g., 10° to 60°, where the angle may change along the relief portion), which may be the same or different as relief angle $\alpha 3$. Cutting portion 174 includes a leading cutting edge 180, which engages the workpiece and cuts or forms the other portion of the bore in the workpiece. Relief portion 176 (FIG. 9) includes a trailing edge 182, which may be curved as illustrated to help guide waste materials (e.g., fibers, shavings or chips) into flute 22, where the waste materials may be moved towards the shank end of drill bit 10 and away from the workpiece.

If drill bit 10 is an auger drill bit, then the bit includes a lead screw 164 as illustrated in FIGS. 8 and 9. Lead screw 164 may be a threaded, self-feeding conical screw such that in use, lead screw 164 causes bit 10 to be urged into the workpiece. Lead screw 164 in the illustrated embodiment has a maximum diameter 166 at its base that is less than the diameter of elongated shaft 12, e.g., less than half the diameter of shaft 12. In the illustrated embodiment, the threads of lead screw 164 taper to a point or tip 168, which is the first structure of drill bit 10 to engage the workpiece. If drill bit 10 is instead a standard drill bit, then lead screw 164 is not provided.

Head 150 includes at least one groove 190 in first cutting portion 154, which may extend as illustrated through taper edge 158, and at least one groove 200 in second cutting portion 174, which may extend as illustrated through taper edge 178. As illustrated in FIGS. 8 and 9, grooves 190 and 200 extend in an embodiment through the ends of their respective leading cutting edges 160 and 180. Grooves 90 and 100 may be sized and shaped the same or be different in size and/or shape from one another.

Groove 190 may include elongate groove edges 192 and 194 that taper or angle towards each other as the edges extend from leading cutting edge 160 towards and through taper edge 158 defining the rear of cutting portion 154 of first cutting arm 152. Edges 192 and 194 form a "V" shape in the illustrated embodiment. In an embodiment, a maximum depth $d_{190}$ of groove 190 is up to and including four millimeters ("mm") for a ½ inch diameter drill bit 100. Maximum depth $d_{190}$ may increase, e.g., proportionally, as the diameter of drill bit 10 increases. Maximum depth $d_{190}$ may be for example 5% to 10% of the distance of radius R from central axis 14 to the outer surface of shaft 12. In an embodiment, a maximum width $w_{190}$ of groove 190 between edges 192 and 194 is up to and including five millimeters ("mm") for a ½ inch diameter drill bit. Maximum width $w_{190}$ may increase, e.g., proportionally, as the diameter of drill bit 10 increases. Maximum width $w_{190}$ may be for example $\beta 5$% to 30% of the distance of radius R from central axis 14 to the outer surface of shaft 12. In an embodiment, a length $l_{190}$ of groove 190 from leading cutting edge 160 to the opposing taper edge 158 is up to and including ten millimeters ("mm") for a ½ inch diameter drill bit. Maximum length $l_{190}$ may increase, e.g., proportionally, as the diameter of drill bit 10 increases. Length $l_{190}$ may be for example 15% to 85% of the distance of radius R from central axis 14 to the outer surface of shaft 12.

Groove 200 may again be sized and shaped the same or be different from groove 190. Groove 200 may include elongate groove edges 202 and 204 that taper or angle towards each other as the edges extend from leading cutting edge 180 towards and through taper edge 178 defining the rear of cutting portion 174 of first cutting arm 172. Edges 202 and 204 form a "V" shape in the illustrated embodiment. In an embodiment, a maximum depth $d_{200}$ of groove 200 is up to and including five millimeters ("mm") for a ½ inch diameter drill bit. Maximum depth $d_{200}$ may increase, e.g., proportionally, as the diameter of drill bit 10 increases. Maximum depth $d_{200}$ may be for example 5% to 10% of the distance of radius R from central axis 14 to the outer surface of shaft 12. In an embodiment, a maximum width $w_{200}$ of groove 200 between edges 202 and 204 is up to and including five millimeters ("mm") for a ½ inch diameter drill bit. Maximum width $w_{200}$ may increase, e.g., proportionally, as the diameter of drill bit 10 increases. Maximum width $w_{200}$ may be for example 5% to 30% of the distance of radius R from central axis 14 to the outer surface of shaft 12. In an embodiment, a length $l_{200}$ of groove 200 from leading cutting edge 180 to the opposing taper edge 178 is up to and including ten millimeters ("mm") for a ½ inch diameter drill bit. Maximum length $l_{200}$ may increase, e.g., proportionally, as the diameter of drill bit 10 increases. Length $l_{200}$ may be for example 15% to 85% of the distance of radius R from central axis 14 to the outer surface of shaft 12.

Grooves 190 and 200 of head 150 cause cutting edges 160 and 180, respectively, to be split into smaller cutting edge segments as with head 50. The smaller cutting edge segments cut smaller fibers, shavings or chips. The smaller fibers, shavings or chips are more easily removed via grooves 190 and 200 and/or relief portions 156, 176 into inlet throat 24 of helical flute 22 where they can be transported towards shank 30 of drill bit 10. The smaller fibers, shavings or chips are also less likely to (i) become bound between outer surface 16 of elongate shaft 12 and an inner surface of a circular bore made by drill bit 10 and (ii) cause the user to have to back drill bit 10 out of the workpiece to clear the waste materials. For multiple reasons, grooves 190 and 200 improve the cutting of drill bit 10, including the speed at which the drill bit may advance through the workpiece and the overall throughput of the bit to complete the job.

The primary differences between head 150 and head 50 are that relief angles α3 and α4 (not seen) of head 150 are at least initially steeper than relief angles α1 and α2 of head 50. Relief angles α3 and α4 (not seen) of head 150 are also more steeply curved than relief angles α1 and α2 of head 50, which are flatter. Also, grooves 190 and 200 extend to a lesser extent into relief portions 156 and 176, respectively, than do grooves 90 and 100, which extend almost completely through (or completely through) relief portions 156 and 176, respectively.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims. For example, while the drawings illustrate first cutting portions 54 and 154 of head 50 and 150 having a single groove 90 or 190 and second cutting portions 74 and 174 having a single groove 100 or 200, either or both first cutting portion 54/154 or second cutting portion 74/174 may alternatively have two or more grooves extending through their respective leading cutting edge, so as to form three or more cutting edge portions. The two or more grooves may be generally shaped the same as grooves 90/190 and 100/200 but be made narrower so as to allow for amply sized leading cutting edge segments to cut the workpiece sufficiently. It should be appreciated that multiple grooves per cutting portion 54/154 and/or cutting portion 74/174 form even smaller fibers, shavings or chips.

It should also be appreciated that first and second cutting arms 52/152 and 72/172 of head 50 do not have to include relief portions 56/156 and 76/176, respectively, and instead may include generally planar cutting portions 54/154 and 74/174, respectively, that extend from cutting edges 60/160 and 80/180 to trailing edges 62/162 and 82/182, respectively.

The invention claimed is:

1. A drill bit comprising:
   an elongated shaft including an outer surface forming plural lands and spaces between the lands forming a helical flute;
   a shank located at a first end of the elongated shaft, the shank configured and arranged to engage the drill bit in a tool;
   a head located at an opposing end of the elongated shaft from the shank, the head including a first cutting arm and a second cutting arm, the first cutting arm including a first cutting portion having a first leading cutting edge and a first taper edge, the second cutting arm including a second cutting portion having a second leading cutting edge and a second taper edge;
   wherein at least one of the first or second leading cutting edges extends at least substantially perpendicular to a longitudinal axis of the drill bit when viewing the drill bit along its longitudinal axis; and
   wherein the first cutting arm includes a first groove extending at least substantially straight from the first leading cutting edge to the first taper edge and the second arm includes a second groove extending at least substantially straight from the second leading cutting edge to the second taper edge, the first and second grooves configured to cause shorter fibers, shavings or chips to be formed when the elongated shaft is operated by the tool.

2. The drill bit of claim 1, wherein the first and second at least substantially straight grooves are at least substantially aligned relative to a longitudinal axis extending through the drill bit.

3. The drill bit of claim 1, wherein the first and second at least substantially straight grooves are at least substantially parallel to each other.

4. The drill bit of claim 1, which is an auger drill bit, wherein the head includes a lead screw aligned along a central axis of the head.

5. The drill bit of claim 1, wherein the first and second grooves are at least one of sized or shaped the same.

6. The drill bit of claim 1, wherein the first and second grooves are at least one of sized or shaped differently.

7. The drill bit of claim 1, wherein at least one of the first or second grooves includes first and second groove edges that taper towards each other.

8. The drill bit of claim 1, wherein at least one of the first or second grooves includes first and second groove edges that meet at a rounded interface.

9. The drill bit of claim 1, wherein at least one of the first or second grooves includes a maximum depth of up to and including four millimeters for a ½ inch diameter drill bit.

10. The drill bit of claim 1, wherein at least one of the first or second grooves includes a maximum depth that is 5% to 10% of the distance of the radius from a central axis of the head to the outer surface of the elongated shaft.

11. The drill bit of claim 1, wherein at least one of the first or second grooves includes first and second edges and a maximum width between the first and second edges of up to and including five mm for a ½ inch diameter drill bit.

12. The drill bit of claim 1, wherein at least one of the first or second grooves includes first and second edges and a maximum width between the first and second edges that is 5% to 30% of the distance of the radius from a central axis of the head to the outer surface of the elongated shaft.

13. The drill bit of claim 1, wherein at least one of the first or second grooves includes a maximum length from the first or second leading cutting edge to an opposing end of the groove of up to and including ten mm for a ½ inch diameter drill bit.

14. The drill bit of claim 1, wherein at least one of the first or second grooves includes a length from the first or second leading cutting edge to an opposing end of the groove that is 15% to 85% of the distance of the radius from a central axis of the head to the outer surface of the elongated shaft.

15. An auger drill bit comprising:
an elongated shaft including an outer surface forming plural lands and spaces between the lands forming a helical flute;
a shank located at a first end of the elongated shaft, the shank configured and arranged to engage the drill bit in a tool;
a head located at an opposing end of the elongated shaft from the shank, the head including a lead screw, a first cutting portion having a first leading cutting edge and a first taper edge and a second cutting portion having a second leading cutting edge and a second taper edge; and
wherein the first cutting portion includes a first at least substantially straight groove having at least one substantially straight edge extending through the first leading cutting edge and the first taper edge so as to form plural first cutting edge segments, and the second cutting portion includes a second at least substantially straight groove having at least one substantially straight edge extending through the second leading cutting edge and the second taper edge so as to form plural second cutting edge segments.

16. The auger drill bit of claim 15, wherein at least one of the first or second cutting portions includes two or more grooves extending through their respective leading cutting edge so as to form three or more cutting edge segments.

17. A method of operating an auger drill bit comprising:
enabling an elongated shaft of the auger drill bit to be turned by a tool;
forming plural at least substantially straight grooves through plural leading cutting edges and plural taper edges to cause the cutting edges of the auger drill bit to be discontinuous, the grooves extending in a parallel manner from a respective leading cutting edge to a respective taper edge about opposing sides of a lead screw of the auger drill bit, the discontinuous cutting edges creating discontinuous and thereby shorter fibers, shavings or chips when the elongated shaft is turned by the tool; and
enabling the shorter fibers, shavings or chips to be routed towards a tool end of the auger drill bit via a flute formed in the elongated shaft.

\* \* \* \* \*